May 17, 1960

O. A. NESS 2,937,348

FILTER

Filed Jan. 14, 1957

*INVENTOR.*
ODVAR A. NESS

BY *Connolly and Hutz*

HIS ATTORNEYS

United States Patent Office 2,937,348
Patented May 17, 1960

2,937,348
FILTER

Odvar A. Ness, Williamstown, Mass., assignor to Sprague Electric Company, North Adams, Mass., a corporation of Massachusetts Application January 14, 1957, Serial No. 634,056

3 Claims. (Cl. 333—79)

This invention relates to electrical components and more particularly to miniaturized capacitive-inductive networks utilizing an electrolytic type of capacitor for the network capacity.

The present day requirements of electronic circuits have imposed a continuing requirement of volume decrease upon electronic equipments which has been steadily met primarily by the decrease in size of electronic components and the utilization of printed circuits. Capacitive-inductive electrical networks such as filters, pulse shaping networks, delay lines and similar articles have heretofore used the combination of separate inductive and capacitive elements. The combination of these elements into the network has not only limited the compactness of their housing, but also introduced substantial design problems arising out of the reactive character of the interconnecting leads for the various components.

It is therefore an object of the present invention to decrease the size required for capacitive-inductive networks. It is a further object of the invention to produce designable networks of predictable electrical characteristics. A still further object of this invention is to produce a filter having substantially flat linear impedance properties over a broad range of frequency. Further objects of this invention will be apparent from the following specification and the appended drawings in which.

Figure 1:
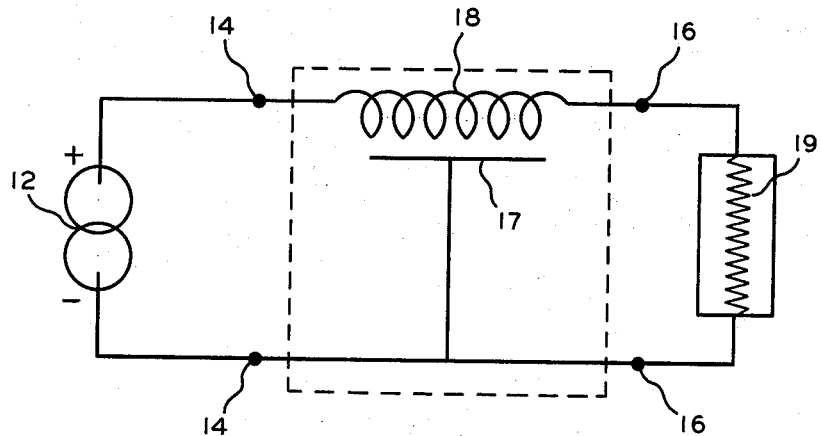
Fig. 1 shows a schematic circuit utilizing the network of this invention.

The objects set forth above have been achieved in accordance with this invention by the production of an electronic circuit comprising a source of varying electrical energy connected to the input terminals of a network comprising a film-forming electrode possessing self-inductance coated with an oxide dielectric layer, an electrolyte contiguous with said oxide layer and a second electrode, said coated electrode having at least one input and one output contact, said input terminals including said input contact and said second electrode, and a load connected to the output terminals of said network which output terminals include said output contact and said second electrode.

In a limited embodiment, the objects set forth have been met in accordance with the invention by the production of a network comprising a film-forming metal electrode having terminals at its opposed ends, said electrode helically wound and coated with a dielectric oxide film and an electrolyte contiguous with said film and a second electrode.

For high temperature applications, that is temperatures above 85° C., the preferred embodiment of this invention is in the form of a network comprising a tantalum wire electrode wound about a core of ferromagnetic material, said electrode coated with an oxide dielectric film and an electrolyte essentially of a reduction semiconductor metal oxide contiguous with said film and a second electrode.

As apparent from the above description, it has been discovered that one can advantageously utilize the electrode of a conventional electrolytic capacitor as the inductive element of an inductive-capacitive network to overcome the disadvantages of the prior art. The amount of inductance of this capacitor electrode can be advantageously increased by the use of wire, which at certain frequencies exhibits substantial self-inductance, wound in a helical manner and, if desired, wound about a toroid, or other type core, of a ferromagnetic material. For this the purpose of disclosure, the term helical includes the spiral which is merely a helix in a single plane.

The oxide coated metal useful in this application can be of any of the film-forming or so-called valve metals which are well known to the art, for example, tantalum, aluminum, columbium, or titanium. In general, any member of that class of metals capable of electrolytically forming a dielectric coating upon being made the anode in an electrolytic solution, and which has an oxide of substantially similar density to its own density, may be utilized. The oxides which form the dielectric of these film-forming metals have a generally high dielectric constant and upon fracture or breakdown are reparable when the electrode is used in combination with a readily reducible electrolyte which under the influence of imposed potential oxidizes the ruptured film to repair the electrical defect. In order to increase the effective inductance of this electrode, it has been found useful to employ the film-forming metals in the form of wire which can be etched if desired to increase the effective surface area and in turn the capacity of the component. In low voltage applications, plain or unetched wire provides a completely satisfactory primary electrode. The wire may be solid strand of a valve metal, or it may be a strand of another metal coated, plated, or clad with a valve metal. It should also be noted that a tubular conductor, having an outer skin of a valve metal, may be filled with ferromagnetic material to increase the inductive component. Also, while the disclosure to this point has been limited to wire, the use of narrow foil of the valve metals is entirely satisfactory and is to be considered to be within the scope of this invention. The wire, although possessing self-inductance, can have increased self-inductance by being wound into one or more convolutions. My invention distinguishes from the capacitors of the art in its broadest sense by the disposition of a plurality of contacts to the electrode possessing self-inductance at separated points so as to obtain the requisite inductance impedance of the electrode or component between the contacts. Thus, when this device is used in circuit applications, the two terminals in contact with the electrode having the inductance will be at different circuit potentials; which concept is not present in the art. The dielectric film which is imposed upon the electrode and which is used as the primary dielectric of the capacitive portion of this network of the invention is the oxide of the metal constituting the coated electrode. This oxide coating is of the type well known in the electrolytic capacitor art and can be produced in a number of ways, the best of which is by anodic oxidation of the electrode in any of the formation electrolytes, such as an aqueous solution of boric acid for aluminum, well-known to the art.

Disposed against the oxide dielectric is a conducting system of low resistivity which system is capable of oxidation of the film-forming metal so as to repair any electrical damage which occurs to the dielectric film. This conducting system which separates the second electrode of the capacitive portion of the network is preferably a solid electrolyte system. The solid electrolytes include metallic oxide semiconductors, e.g., the higher oxides of manganese, lead, tin, or nickel. In general, any reduction semiconductor, that is any compound whose conductivity increases upon chemical reduction, may be used. These reduction semiconductors are further characterized as the higher oxides of multi-valent metals, and are of n-type conductivity. Of course it is realized that for certain applications temperature-wise, certain of these electrolytes with their advantages in that range would be used.

The second electrode which forms an integral part of the capacitive portion of my network can take many forms, depending particularly upon the type of electrolyte which is used in the component. For the solid reduction semiconductor electrolyte, the second electrode is generally a composite structure comprising an inner layer of deposited conductive particles, e.g., carbon, and another or outer layer of different metal particles, e.g., sprayed copper. Again for certain applications, it is within the scope of the invention to utilize a second electrode which may have a dielectric film present on the surface and/or include an electrode which has increased self-inductance such as a wound wire, etc.

Fig. 1 of the appended drawing shows a generator of electric energy 12 having its terminals connected to the input terminals 14 of the network of the invention. The network of the invention which is schematically positioned between the input terminals 14 and output terminals 16 and enclosed by the dotted lines is shown as an inductive element 18 which exhibits capacity between itself and the other electrode 17 shown as a straight line. The capacity is developed between the two electrodes 18 and 17 by means of the thin dielectric film which has been placed upon the conductor which forms the electrode 18. The output terminals 16 are shown as connected to load 19 which actually can be of any type of impedance, that is inductance, capacitive, resistive or any combination thereof. It is to be noted that the input terminal 14 which is connected to one of the contacts of the electrode 18 and the output terminal 16 which is connected to the other contact of the other electrode 18 are at different electrical potentials in contrast to the conventional practices of the art where more than one contact might have been made to the electrode of an electrolytic capacitor. The schematic of Fig. 1 can represent among the many embodiments known to the art a low pass filter which functions to eliminate from the load that interference present in the generator.

Figure 2:
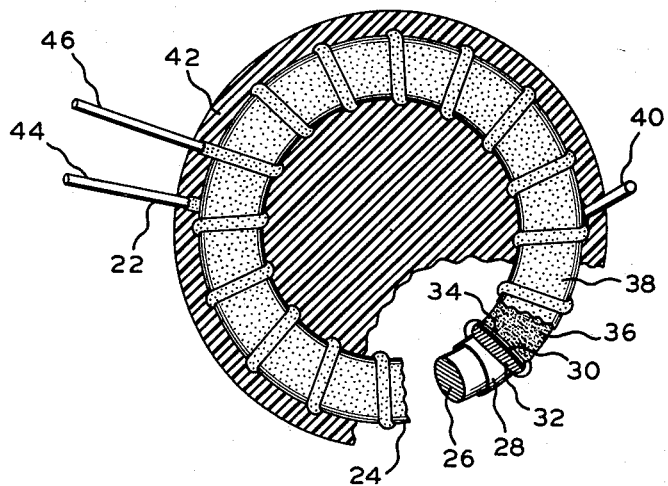
Fig. 2 shows in cross-section and in cut-away a capacitive-inductive network utilizing a solid semi-conductor electrolyte.

Fig. 2 shows a pictorial representation of a preferred embodiment of this invention utilizing a metallic oxide reduction semiconductor as the conducting medium and heating means for the capacitor portion of the network. This particular embodiment is particularly useful for high and low temperature applications of the network such as at temperatures of 125° C. and −55° C. respectively. In this inductive portion of the network is shown an oxide coated film-forming metallic wire 22 helically wound about a toroid 24 of a ferromagnetic material such as a mixed crystalline ferrite, e.g., manganese zinc ferrite. The assembly is shown in partial cross-section so as to readily define the various layers present in the apparatus. The toroid of ferromagnetic material is coated with a thin layer of an insulator 28 on which is wound the oxide coated wire 32, showing the oxide coating which forms the primary dielectric as 30. Contiguous with this oxide layer is the electronic reduction semiconductor such as manganese dioxide 34 and with the outer electrode which is shown as a composite of conducting carbon particles 36 and an outer sprayed coating of metal 38. To this outer electrode 38 a terminal wire 40 is soldered with a lead-tin alloy. The entire assembly is shown as coated with a dielectric resin, e.g., an epoxy resin 42 which functions primarily as a mechanical barrier to prevent injury to the encased component. Of course it is realized that the structure can be encased in any suitable container both resin and metal, although in the latter embodiment the input terminal 44 and output terminal 46 must be electrically insulated one from the other, or alternatively used without any external casing. Care must be exercised in the application of the successive coatings on the wound core to prevent shorting of the two electrodes of the wire. That is, each end of the wire should be free of coating for the attachment (e.g., lap welding) of a solderable lead, and the semiconductor, the graphite and the copper must contact the wire beyond the point where the oxide coating has been formed. The separation of the input and output leads can be modified as desired so as to prevent excessive shunt capacity therebetween.

The hereinafter set forth specific example is to show the reduction of the invention, and is not to be construed as limiting this invention in any manner:

A 25 mil diameter tantalum wire, electrochemically etched according to the process set forth in the British Patent 702,877, was wound with 10 turns about an uninsulated toroid of manganese zinc ferrite. This subassembly was formed to 190 volts in a 10% by weight aqueous solution of phosphoric acid. The formed electrode showed a leakage current of .1 milliamperes at 100 volts. As an alternative, a length of unetched tantalum wire was formed prior to winding about the core. In this case the wire was formed to 50 volts in a 10% by weight aqueous phosphoric acid solution. Ten turns of this oxide coated tantalum wire were made about a toroid of Permalloy (a ferromagnetic material by Aronld Engineering Company of Marengo, Illinois), the toroid having a 1 inch outer diameter and a ½ inch inner diameter, and of about ¼ of an inch in thickness with a separation of about ⅛ of an inch between turns. In this case, the toroid was insulated by a layer of silicone rubber which was baked-on at 250° C. prior to the winding of the anode wire. In both cases, the assembly was thereafter dipped into a 50% aqueous suspension of manganous nitrate and fired at 400° C. for two minutes after removal. It has been found that this pyrolitic conversion of manganous nitrate to manganese dioxide should be accomplished in the relatively narrow range of 350° C. to 450° C. for best results. The unit was redipped in the manganous nitrate suspension followed by refiring for a total of five times. After this, it was dipped into an aqueous graphite suspension and after drying was sprayed with copper, using a Schoop gun, to produce the outer electrode. A lead wire was then attached to the copper outer shell to function as the second terminal of the capacitive component. The entire unit was then potted in an epoxy (condensation product of epichlorohydrin and bisphenol) resin to prevent the passage of moisture and to lessen mechanical injury. This unit showed an inductance of 11 microhenries at 1000 cycles and a capacity of 48 mfds. The impedance characteristics or insertion loss is substantially flat over a broad frequency range (0.1 to 1000 mc.) for this unit and is roughly between 50 and 60 db.

While the only core disclosed thus far has been in the form of a toroid, several other shapes have obvious utility. The core may be in the form of a slug or solenoid or a pot core. Furthermore, instead of a composite core and separable winding, utility is to be found in an integral core having sintered valve metal on its surfaces. Two embodiments of this latter concept lend themselves well to present day ceramic techniques, namely a core having a grooved spiral track which is filled with sintered in place powdered valve metal, and a core having a skin of valve metal which may later be selectively removed to leave a spiral path.

The advantages of my invention arise primarily out of the concept of associating the inductive component with the capacitive section as an integral thereof. Thus advantages in addition to substantial reduction in size include improved electrical characteristics primarily in the form of substantial linear impedance over an extremely wide frequency range and ease in design of networks. I have also taught of a network which is operable at elevated and depressed temperatures without material change in electrical characteristics of the unit over that shown at normal operating temperatures.

As many apparently widely different embodiments of this invention may be made without departing from the spirit and scope thereof, it is to be understood that the invention is not limited to the specific embodiments hereof except as defined in the appended claims.

What is claimed is:

1. A network comprising an oxide coated tantalum wire wound about an electrically insulated core of ferromagnetic material, a continuous layer of a reduction semiconductor disposed on said oxide coating, and a second electrode comprising an inner layer of graphite and an outer layer of sprayed metal disposed on said semiconductor layer, said tantalum wire having a terminal at each end, and said sprayed metal layer being provided with a terminal.

2. A filter comprising a film-forming metal electrode in the form of a wire and having an oxide coating thereon, a ferromagnetic toroid, said wire wrapped around said toroid in a plurality of turns, a reduction semiconductor disposed on substantially the entire surface of said oxide coating and leaving the ends of said wire exposed so that said ends function as two terminals of the filter, a layer of substantially inert metal disposed on said semiconductor, and a terminal in contact with said inert metal layer.

3. A filter comprising a tantalum wire wound around a non-conducting magnetic toroid, the ends of said wire serving as terminals of the filter, a dielectric coating of tantalum oxide on said wire, a layer of manganese dioxide in intimate contact with said tantalum oxide, a layer of substantially inert material disposed on said manganese dioxide, and a terminal in contact with said inert layer.

References Cited in the file of this patent

UNITED STATES PATENTS

| | | |
|---|---|---|
| 1,678,824 | Ruben | July 31, 1928 |
| 2,504,178 | Burnham | Apr. 18, 1950 |
| 2,526,321 | Beverly | Oct. 17, 1950 |
| 2,793,333 | Ehlers | May 21, 1957 |
| 2,841,771 | Dunleavey | July 1, 1958 |

UNITED STATES PATENT OFFICE
CERTIFICATE OF CORRECTION

Patent No. 2,937,348                                             May 17, 1960

Odvar A. Ness

It is hereby certified that error appears in the printed specification of the above numbered patent requiring correction and that the said Letters Patent should read as corrected below.

Column 1, line 69, after "of" insert -- a --; column 2, line 12, strike out "this"; column 3, line 53, for "heating" read -- healing --.

Signed and sealed this 29th day of November 1960.

(SEAL)
Attest:

KARL H. AXLINE                                            ROBERT C. WATSON
Attesting Officer                                         Commissioner of Patents